UNITED STATES PATENT OFFICE.

GEORGE L. SCHAEFER, OF NEW YORK, N. Y., AND AUGUST SCHAEFER, OF BASEL, SWITZERLAND.

PROCESS OF PREPARING CELLULOSE FOR ARTIFICIAL SILK.

No. 879,416.     Specification of Letters Patent.     Patented Feb. 18, 1908.

Application filed June 5, 1907. Serial No. 377,477.

*To all whom it may concern:*

Be it known that we, GEORGE L. SCHAEFER, a citizen of the United States, residing in New York, in the borough of Brooklyn, county of Kings, and State of New York, and AUGUST SCHAEFER, a citizen of the Empire of Germany, residing in Basel, in the Confederation of Switzerland, have invented certain new and useful Improvements in Processes of Preparing Cellulose for Artificial Silk, of which the following is a specification.

It happens frequently in the manufacture of artificial silk and horsehair from cellulose that satisfactory, clear and easily-flowing solutions of high concentration and free liquidity cannot be obtained with reliable and uniform certainty. Especially is this the case when cellulose dissolved in an ammoniacal solution of cupric hydroxid is employed, so that in many cases no useful result is obtained.

We have discovered that an ammoniacal solution of cupric hydroxid when prepared under certain conditions, will fully meet the requirements of a solution for cellulose when the cellulose is submitted to a preparatory treatment whereby its solubility is not only considerably increased, but an absolutely clear and freely-flowing solution obtained.

For this purpose the invention consists of a process of treating the cellulose preparatory to dissolving the same in the solvent as will be fully described hereinafter and finally pointed out in the claims.

In carrying out our invention 500 liters of water are mixed with 30 kilograms of sodium carbonate and 40 liters of caustic potash of 24° Bé. and heated under continuous stirring at a temperature of from 50 to 60° C. in an open iron vessel which is heated by means of a steam-coil that is placed in the same or by means of a steam-pipe which delivers steam into the solution. To this mixture 5 liters of tar benzin are added under continuous stirring until a uniform mixture is obtained. The liquor thus obtained is transferred into a jacketed boiler which is tightly closed by a suitable cover, and in which the cellulose has been placed. The quantity of liquor in the boiler has to cover entirely the cellulose placed in the same. 2 liters of tar benzin are then added to the liquor and the mixture is then boiled under continuous stirring by admitting steam to the boiler at a pressure of about one atmosphere and a temperature corresponding to this pressure. The boiling is continued for about two hours.

After the boiling, the solution is washed with a considerable quantity of water, after which the excess of water is separated from the cellulose in a centrifugal machine, after which it is subjected for several hours to the bleaching action of a weak solution of hydrogen peroxid. The cellulose is then again washed with a considerable quantity of water, then again separated from the water by centrifugal force, and then placed in a diluted sulfuric acid bath. After this the cellulose is again separated from the excess of liquid so as to form a somewhat brittle quality, and then again subjected for a short time to the bleaching action of a diluted solution of hydrogen peroxid. The bleached cellulose is again washed with a considerable quantity of water, next freed from the excess of water by centrifugal force, and then placed in wet state into an ammoniacal solution of cupric hydroxid.

The cellulose can also be treated in the following manner: The cellulose is separated from the excess of water after being boiled as before described and is then placed into a very diluted bath of hydrochloric acid, after which it is separated from the surplus liquid and treated with a diluted solution of hydrogen peroxid, then dried up to a certain degree, so that it contains about 20% of water, then chopped or torn into small pieces by a suitable machine, after which it is ready for dissolution.

Cellulose prepared in the foregoing manner is easily dissolved by the solvent, forms a clear solution and gives very good and reliable results.

Having thus described our invention, we claim as new and desire to secure by Letters Patent:

1. The process herein described of preparing cellulose for making artificial silk, which consists in subjecting the cellulose at a high temperature and a pressure of about one atmosphere successively to the action of a weak alkaline liquor and tar benzin, then to a diluted acid, and lastly to hydrogen peroxid.

2. The process herein described of treating cellulose preparatory to dissolving the same for making artificial silk, which consists in boiling the cellulose in a weak solution of sodium carbonate, a caustic alkali and tar benzin under a pressure of about one atmosphere and a correspondingly high temperature, then treating it with diluted sulfuric acid, and finally bleaching it with hydrogen peroxid.

3. The process of treating cellulose preparatory to dissolving the same for making artificial silk, which consists in boiling the cellulose under pressure and at a correspondingly high temperature in a solution of sodium carbonate, caustic alkali and tar benzin, then washing the same, next subjecting it to the action of a diluted acid, again separating the surplus water therefrom, and then bleaching the same with hydrogen peroxid.

In testimony, that we claim the foregoing as our invention, we have signed our names in presence of two subscribing witnesses.

GEORGE L. SCHAEFER
AUGUST SCHAEFER.

Witnesses to the signature of George L. Schaefer:
PAUL GOEPEL,
HENRY J. SUHRBIER.

Witnesses to the signature of August Schaefer:
ADOLPH FISCHER,
ARTHUR SCHWARZ.